July 13, 1948.   F. E. BRADY, JR   2,445,018
SEALING UNIT
Filed Oct. 10, 1945
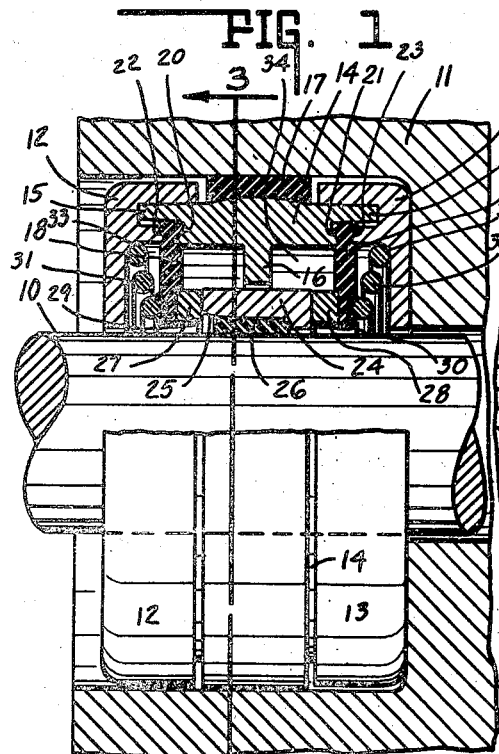
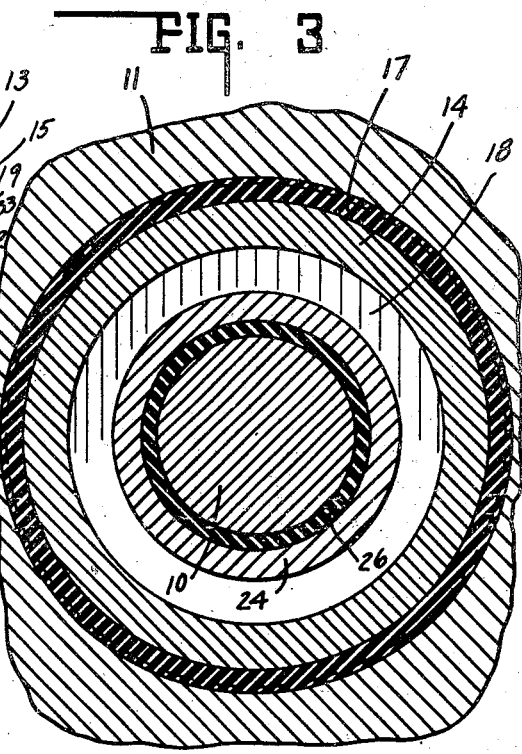
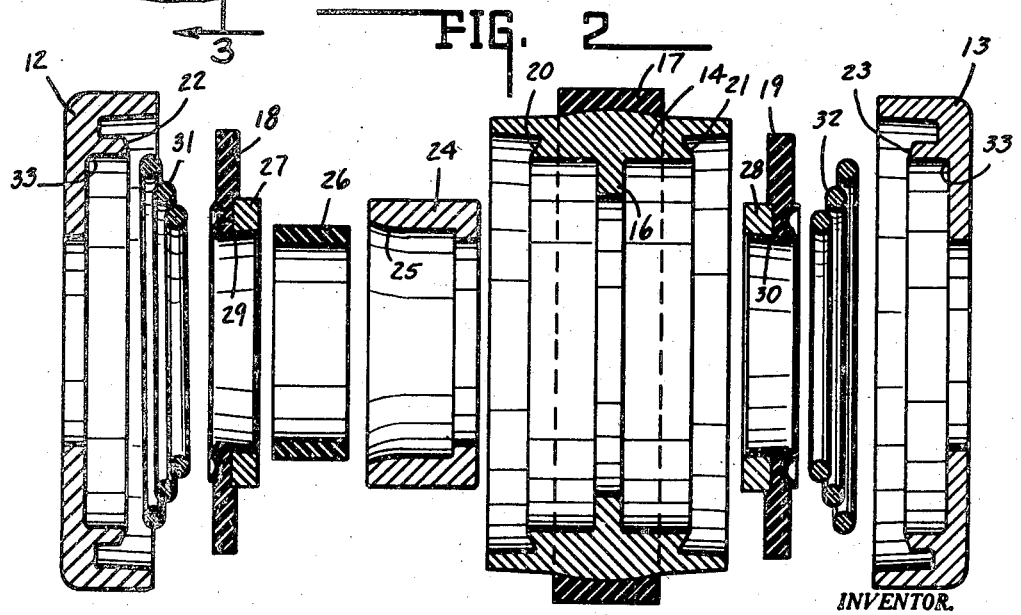
INVENTOR.
FRANCIS E. BRADY, JR.
BY
Lockwood, Goldsmith & Galt,
ATTORNEYS.

Patented July 13, 1948

2,445,018

UNITED STATES PATENT OFFICE 2,445,018

SEALING UNIT

Francis E. Brady, Jr., Muncie, Ind.

Application October 10, 1945, Serial No. 621,437

2 Claims. (Cl. 286—11)

This invention relates to a seal structure, and more particularly to a self-lubricating, pre-fabricated, self-sealing unit applicable to rotary shafts.

It is the object of this invention to provide a pre-lubricated and self-lubricating, prefabricated unitary seal for a shaft or the like, and wherein said unit provides a completely closed and sealed assembly for ready application to a shaft and its bearing housing. In a seal of this character it is contemplated that it be so constructed as to be pre-tested against fluid leakage under pressure before being sold, shipped and installed.

It is a further object of the invention to construct a rugged long-life seal of this character which may be readily inserted in operative position as a unit, and which will provide pressure-tight sealing conditions capable of being maintained notwithstanding inaccuracies in alignment or eccentricities of the shaft, and which contains its own body of lubricant for supplying the running sealing surfaces to maintain a highly effective sealing condition without further attention throughout the entire life of the unit.

The full nature of the invention will be understood from the accompanying drawings and the following description and claims:

Fig. 1 is illustrative of the assembled unit mounted in operative position on a shaft and within the shaft bearing housing, the upper portion thereof being shown in central vertical section and the lower portion thereof in elevation.

Fig. 2 is an exploded view of the seal.

Fig. 3 is a section taken through the lines 3—3 of Fig. 1.

In the drawings there is shown a modification of the sealing unit illustrative of the invention, and wherein said unit is shown as mounted upon a shaft 10 extending into the bearing housing 11 for relative rotation therebetween, and wherein the sealing unit is adapted to prevent leakage of fluid between said shaft and housing.

The sealing unit comprises a pair of spaced annular cup-like metal end caps 12 and 13 which are centrally apertured to provide openings for the shaft 10. The periphery of said end caps are flanged inwardly to embrace the interior elements of the seal.

Supported and clamped between said end caps there is an outer closure element or seal cartridge 14 having outwardly extending annular flanges 15 and a centrally disposed inwardly extending web 16. Surrounding the cartridge 14 and permanently secured centrally of its periphery to extend throughout the space intermediate the inwardly extending flanges of the caps 12 and 13 there is provided a rubber bore seal 17. Said caps 12 and 13, together with the seal 17, when assembled, are so formed as to snugly fit within the bore of the bearing housing 11 whereby there will be sealing contact between the bore and the seal 17.

Within each cap there is provided an annular rubber end diaphragm disc 18 and 19, respectively, each concentric with respect to the axis of the unit. The peripheral edges of said discs are securely clamped between the beveled shoulders 20, 21 of the cartridge 14 and corresponding beveled shoulders 22, 23 of the end caps 12 and 13, respectively.

Between the diaphragm discs 18, 19 and surrounding the shaft 10, or the aperture of the unit through which the shaft is adapted to extend, there is mounted an inner sealing ring 24 which is elongated to provide a tapered inner surface indicated at 25. Within the tapered inner surface of the ring 24 there is a rubber sleeve of such inner diameter as to permit it to be slid longitudinally over the surface of the shaft, or the shaft caused to slide longitudinally therethrough, but due to its tension and the wedging action caused by the tapered surface 25 of the ring 24 will be wedged and pressed into sealing contact with the surface of the shaft.

Opposed ends of the sealing ring 24 are lapped to provide a sealing surface adapted to have running sealing engagement with lapped sealing surfaces over the opposed outer sealing rings 27 and 28. Thus the elongated sealing ring 24 is sealed about the shaft for rotation therewith, whereas the outer sealing rings 27, 28 are held fixed with the remaining elements of the sealing unit and the housing 11.

Embracing the inner edges of each of the diaphragms 18, 19 and extending over the inner surface of the outer sealing rings 27, 28 there are provided spring retaining pressure caps 29 and 30 respectively. Said caps are somewhat V-shaped in cross-section to provide one annular flange portion for bearing against the outer surface of the diaphragms 18, 19, and wherein the outer edge of such flange portion is curved outwardly to provide a bearing for the lower coil of the respective conical springs 31, 32. The outer coil of said springs nest within and bear against a suitable seat indicated at 33 provided in the end caps 12 and 13. The other flange portion of said spring retaining pressure caps 29, 30 is formed to extend inwardly and flare outwardly to interlock and secure together the diaphragms 18, 19 and the outer sealing rings 27, 28 respectively.

By reason of the diaphragms 18 and 19 which are sealed about their outer and inner edges as above described, a fluid tight chamber indicated at 34 is provided, such as to contain a suitable lubricant. Said chamber, and therefore the lubricant, has access only to the running sealing surfaces between the inner sealing ring 24 and the opposed outer sealing rings 27, 28.

As illustrated in Fig. 2, the various parts of the seal as above described are assembled over each end of the control structure comprising the sealing cartridge 14 and inner sealing ring 24 after the outer bore seal 17 has been mounted upon the former and the shaft seal 26 has been mounted within the latter. However, the diaphragms 18 and 19, their respective outer sealing rings 27, 28, and the spring retaining pressure caps 29, 30, may be pre-assembled as sub-units through the medium of clamping them together by upsetting the tapered bore of the pressure caps. After these sub-units are mounted in place at each end of the control structure, the springs 31, 32 are positioned after which the end caps are pressed over and permanently secured to the cartridge 14. It may be noted that at the proper step of the assembly the chamber 34 is filled with the desired lubricant.

After the seal is thus permanently assembled with the lubricant therein, it may be placed on test in any suitable testing device for leakage or other adverse conditions, after which it may then be installed by sliding over the shaft and within the bore of the bearing housing, or on the other hand it may be installed in the bore and the shaft inserted therethrough.

While the modification of the sealing unit herein described constitutes a preferred embodiment of invention, it is to be understood that the invention is not limited to the precise form as illustrated and described, but changes may be made therein without departing from the scope of the invention as defined in the appended claims.

The invention claimed is:

1. A self-contained sealing unit for sealing a shaft and bearing having relative rotation, including an elongated inner sealing ring through which the shaft is adapted to extend, each end thereof formed to provide a sealing surface, and having its inner surface tapered, a compressible shaft seal mounted within said sealing ring adapted to be wedged by the tapered inner surface thereof into gripping and sealing engagement with said shaft, a substantially cylindrical cartridge element surrounding said sealing ring in concentric spaced relation thereto to provide a lubricant chamber therebetween, an outer sealing ring having a sealing surface in running sealing engagement with each of the end sealing surfaces of said inner sealing ring, a flexible end closure secured to each of said outer sealing rings and opposed ends of said cartridge element respectively to provide a flexible end wall for said lubricant chamber, and yielding means carried by said cartridge element to maintain said rings in running sealing engagement under pressure while permitting relative rotation therebetween.

2. A self-contained sealing unit for sealing a shaft and bearing having relative rotation, including an elongated inner sealing ring through which the shaft is adapted to extend, each end thereof formed to provide a sealing surface and having its inner surface tapered, a compressible shaft seal mounted within said sealing ring adapted to be wedged thereby into gripping and sealing engagement with the shaft, a substantially cylindrical cartridge element surrounding said sealing ring in concentric spaced relation thereto to provide a lubricant chamber therebetween, said element having annular shoulder forming recessed ends, opposed flexible diaphragm disks, each having its outer periphery sealed within a recessed end of said element, an outer sealing ring having the sealing surface in running sealing engagement with each of the opposed sealing surfaces of said inner sealing ring, a spring retaining pressure cap in clamping engagement with the inner portion of each of said diaphragms and outer sealing rings respectively, end closure caps secured over the opposed ends of said cartridge element, and a pressure spring interposed between each of said end caps and adjacent retaining caps to maintain said inner and outer sealing rings in sealing engagement while permitting relative rotation therebetween, said rings being exposed to said lubricant chamber for lubrication by lubricant contained therein.

FRANCIS E. BRADY, JR.

REFERENCES CITED

The following references are of record in the file of this patent:

UNITED STATES PATENTS

| Number | Name | Date |
| --- | --- | --- |
| 1,617,549 | Schramm | Feb. 15, 1927 |
| 1,992,790 | Victor et al. | Feb. 26, 1935 |
| 2,000,341 | Larsh | May 7, 1935 |
| 2,015,979 | Wahlmark | Oct. 1, 1935 |
| 2,162,104 | Mosher | June 13, 1939 |
| 2,270,811 | Leonard | Jan. 20, 1942 |
| 2,342,955 | Meyer | Feb. 29, 1944 |

FOREIGN PATENTS

| Number | Country | Date |
| --- | --- | --- |
| 544,904 | Great Britain | 1942 |